United States Patent
Erban

(10) Patent No.: US 10,343,531 B2
(45) Date of Patent: Jul. 9, 2019

(54) CONTROL DEVICE FOR A REGENERATIVE BRAKING SYSTEM AND METHOD FOR OPERATING A REGENERATIVE BRAKING SYSTEM

(71) Applicant: Robert Bosch GmbH, Stuttgart (DE)

(72) Inventor: Andreas Erban, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 15/309,928

(22) PCT Filed: Mar. 31, 2015

(86) PCT No.: PCT/EP2015/056952
§ 371 (c)(1),
(2) Date: Nov. 9, 2016

(87) PCT Pub. No.: WO2015/185242
PCT Pub. Date: Dec. 10, 2015

(65) Prior Publication Data
US 2017/0267106 A1    Sep. 21, 2017

(30) Foreign Application Priority Data

Jun. 4, 2014    (DE) .......................... 10 2014 210 559

(51) Int. Cl.
*B60L 7/26* (2006.01)
*B60L 7/18* (2006.01)
(Continued)

(52) U.S. Cl.
CPC ............... *B60L 7/26* (2013.01); *B60L 7/18* (2013.01); *B60L 15/2009* (2013.01); *B60T 1/10* (2013.01);
(Continued)

(58) Field of Classification Search
CPC .......... B60L 7/18; B60L 7/26; B60L 15/2009; B60L 2240/432; B60T 1/10;
(Continued)

(56) References Cited

U.S. PATENT DOCUMENTS

2014/0144728 A1    5/2014    Szeto
2016/0016565 A1*   1/2016    Gabor ...................... B60T 1/10
                                                        701/71
(Continued)

FOREIGN PATENT DOCUMENTS

CN          1876429 A      12/2006
DE     102012211278 A1      1/2014
(Continued)

OTHER PUBLICATIONS

International Search Report dated Jul. 8, 2015, of the corresponding International Application PCT/EP2015/056952 filed Mar. 31, 2015.

*Primary Examiner* — Khoi H Tran
*Assistant Examiner* — Robert T Nguyen
(74) *Attorney, Agent, or Firm* — Norton Rose Fulbright US LLP; Gerard Messina

(57) ABSTRACT

A control device for a regenerative braking system having control electronics, the control electronics being designed, in consideration of at least one provided first variable with respect to a utilized coefficient of friction occurring in each case at the at least one wheel which may be regeneratively braked, to determine at least one preset variable with respect to at least one hydraulic minimum braking torque to be exerted on the at least one wheel which may be regeneratively braked, and, in consideration of at least the at least one determined preset variable, to determine the at least one setpoint variable.

15 Claims, 2 Drawing Sheets

(51) Int. Cl.
  *B60T 13/58* (2006.01)
  *B60T 8/171* (2006.01)
  *B60T 1/10* (2006.01)
  *B60W 30/18* (2012.01)
  *B60L 15/20* (2006.01)

(52) U.S. Cl.
  CPC ............ *B60T 8/171* (2013.01); *B60T 13/586* (2013.01); *B60W 30/18127* (2013.01); *B60L 2240/423* (2013.01); *B60T 2210/12* (2013.01); *B60T 2270/604* (2013.01); *B60T 2270/86* (2013.01); *B60W 2520/28* (2013.01); *Y02T 10/645* (2013.01); *Y02T 10/72* (2013.01); *Y02T 10/7275* (2013.01)

(58) Field of Classification Search
  CPC ........... B60T 2210/604; B60T 2210/86; B60R 8/171; B60R 13/586; B60W 30/18127; B60W 2520/28; Y02T 10/645
  See application file for complete search history.

(56) References Cited

U.S. PATENT DOCUMENTS

| | | | |
|---|---|---|---|
| 2016/0214486 A1* | 7/2016 | Suzuki | B60T 8/175 |
| 2017/0008400 A1* | 1/2017 | Katsuta | B60L 3/0015 |
| 2018/0093571 A1* | 4/2018 | Hall | B60T 1/10 |
| 2018/0141441 A1* | 5/2018 | Kim | B60L 7/18 |
| 2018/0154777 A1* | 6/2018 | Hall | B60L 7/26 |
| 2018/0244157 A1* | 8/2018 | Hirakawa | B60L 7/24 |

FOREIGN PATENT DOCUMENTS

| | | |
|---|---|---|
| JP | H10322803 A | 12/1998 |
| JP | 2005035344 A | 2/2005 |
| KR | 20140054008 A | 5/2014 |
| WO | 2013164979 A1 | 11/2013 |

* cited by examiner

CONTROL DEVICE FOR A REGENERATIVE BRAKING SYSTEM AND METHOD FOR OPERATING A REGENERATIVE BRAKING SYSTEM

FIELD

The present invention relates to a control device for a regenerative braking system. Furthermore, the present invention relates to a method for operating a regenerative braking system.

BACKGROUND INFORMATION

A method for operating a regenerative braking system of a vehicle and a control device for a regenerative braking system of a vehicle are described in German Patent Application No. DE 10 2012 211 278 A1. During an execution of method, at least one valve of a brake circuit of the regenerative braking system is activated before and/or during operation of a generator of the regenerative braking system in such a way that brake fluid is displaced via the at least partially open at least one valve from a master brake cylinder of the regenerative braking system and/or the at least one brake circuit into at least one storage volume. In this way, a brake pressure increase in at least one wheel brake cylinder of the braking system is to be able to be limited or prevented. Preferably, enough brake fluid is displaced into the at least one storage volume that solely regenerative braking is possible. The generator braking torque exerted with the aid of the generator is to correspond in this case to a setpoint total braking torque requested by the driver, while no hydraulic braking torque is exerted on an associated wheel with the aid of the at least one wheel brake cylinder.

SUMMARY

The present invention provides a control device for a regenerative braking system, and a method for operating a regenerative braking system.

The present invention provides possibilities for the regenerative braking of a vehicle with the aid of the electric motor of the recuperative braking system, on the at least one wheel which may be braked by a generator, a hydraulic minimum braking torque to be exerted thereon being determinable at the same time, which is usable if needed for an ABS regulation. Therefore, even if excessively high brake slip values occur, a reduction of the actual generator braking torque exerted with the aid of the electric motor on the at least one wheel which may be regeneratively braked is not necessary. While the regeneration executed with the aid of the electric motor is conventionally often terminated in such a situation (ABS case), with the aid of the present invention, the operation of the electrical generator may be continued without interruption and in an adapted way. In particular, the actual generator braking torque (regeneration torque) which is exerted on the at least one wheel which may be regeneratively braked may also be maintained at a high level during an ABS regulation, while standard (hydraulic) wheel regulation functions are executable for the ABS regulation.

The present invention is suitable for all types of hybrid and electric vehicles. The objects of the present invention may cooperate with standard (hydraulic) ABS regulating methods. A modification of the hydraulic processes executed on the regenerative braking system to remedy excessively high brake slip values on the at least one wheel which may be regeneratively braked is therefore not necessary.

The present invention enables a master-slave function, in which the at least one setpoint variable is determinable with respect to the at least one setpoint generator braking torque so that a sufficiently high hydraulic minimum braking torque remains, without exceeding a total braking torque requested by a driver for a possibly required ABS regulation. The objects of the present invention are also suitable for modular use in existing ESP systems using conventional ABS regulating methods.

In one advantageous specific embodiment, with the aid of the control electronics, for all wheels which may be regeneratively braked, the particular preset variable is determinable individually by wheel in consideration of the particular first variable with respect to the utilized coefficient of friction occurring on the particular wheel which may be regeneratively braked. Therefore, if the control device is used in a vehicle having single wheel drive, each wheel which may be regeneratively braked may be regulated individually.

In another advantageous specific embodiment, the one preset variable, for the hydraulic minimum braking torque which is to be exerted equally on all wheels which may be regeneratively braked, is determinable in consideration of a minimum of the first variables with the aid of the control electronics. The wheel which may be regeneratively braked having the lowest utilized coefficient of friction determines the hydraulic minimum braking torque in this case. This is advantageous above all on so-called mu-split routes or when driving curves with a significant reduction of the wheel contact forces on the inner side of the curve.

For example, the control electronics may be designed for the purpose of determining at least one first highest generator braking torque for the at least one wheel which may be regeneratively braked as the difference of a total braking torque to be exerted on the particular wheel which may be regeneratively braked and the hydraulic minimum braking torque determined for the particular wheel which may be regeneratively braked as the preset variable, and to determine the at least one setpoint variable in consideration of the at least one determined first highest generator braking torque. In this way, in spite of maintaining the at least one hydraulic braking torque (which is determined so it is sufficiently high for a standard/hydraulic ABS regulation), exceeding the total braking torque requested by the driver is preventable.

In one advantageous refinement, the control electronics are designed, in consideration of a predefined characteristic curve and at least one provided second variable with respect to a particular occurring minimum of the wheel contact forces on the at least one wheel which may be regeneratively braked, to determine at least one second highest generator braking torque for the at least one wheel which may be regeneratively braked, and to determine the at least one setpoint variable with additional consideration of the at least one determined second highest generator braking torque. This enables an additional adaptation of the actual generator braking torque, which is exerted on the at least one wheel which may be regeneratively braked, to the at least one occurring wheel contact force. The determination of the at least one second highest generator braking torque may be carried out individually by wheel. A shared second highest generator braking torque may also be determined for all wheels which may be regeneratively braked.

In another advantageous refinement, the control electronics are designed, in consideration of a provided item of information with respect to a generator potential of the electric motor, to determine at least one third highest generator braking torque for the at least one wheel which may be regeneratively braked, and to determine the at least one setpoint variable with additional consideration of the at least one determined third highest generator braking torque. For example, a vehicle velocity and/or a charge level of a battery which is chargeable with the aid of the electric motor may be taken into consideration as the provided information. Generator operation of the electric motor at a vehicle velocity less than a predefined generator usage minimum velocity or in the event of a complete charge of the battery are therefore preventable.

The control electronics are preferably designed to determine, for the at least one wheel which may be regeneratively braked, at least one minimum variable from the particular first highest generator braking torque, the particular second highest braking torque, and/or the particular third highest generator braking torque, and to determine the at least one setpoint variable in consideration of the at least one minimum variable. The at least one setpoint variable is determinable in this case in such a way that the actual generator braking torque of the electric motor, which is exerted on the particular wheel which may be regeneratively braked, does not exceed the particular minimum variable. The generator operation of the electric motor may therefore be adapted to a variety of surroundings conditions.

In another advantageous specific embodiment, the control electronics are designed to compare at least one wheel velocity value of the at least one wheel which may be regeneratively braked to at least one predefined threshold value and, if the at least one wheel velocity falls below the at least one predefined threshold value, when determining the at least one setpoint variable, to only permit the at least one setpoint generator braking torque to be kept constant or reduced. The actual generator braking torque which is exerted with the aid of the generator operation of the electric motor on the at least one wheel which may be regeneratively braked may therefore be optimized with respect to wheel dynamics of the at least one wheel which may be regeneratively braked.

The above-described advantages are also ensured in the case of an execution of the corresponding method for operating a regenerative braking system. The method may be refined according to the above-described specific embodiments of the control device.

BRIEF DESCRIPTION OF THE DRAWING

Further features and advantages of the present invention will be explained hereafter with reference to FIG. 1, which shows a block diagram to explain one specific embodiment of the method for operating a regenerative braking system.

DETAILED DESCRIPTION OF EXAMPLE EMBODIMENTS

Figure 1:
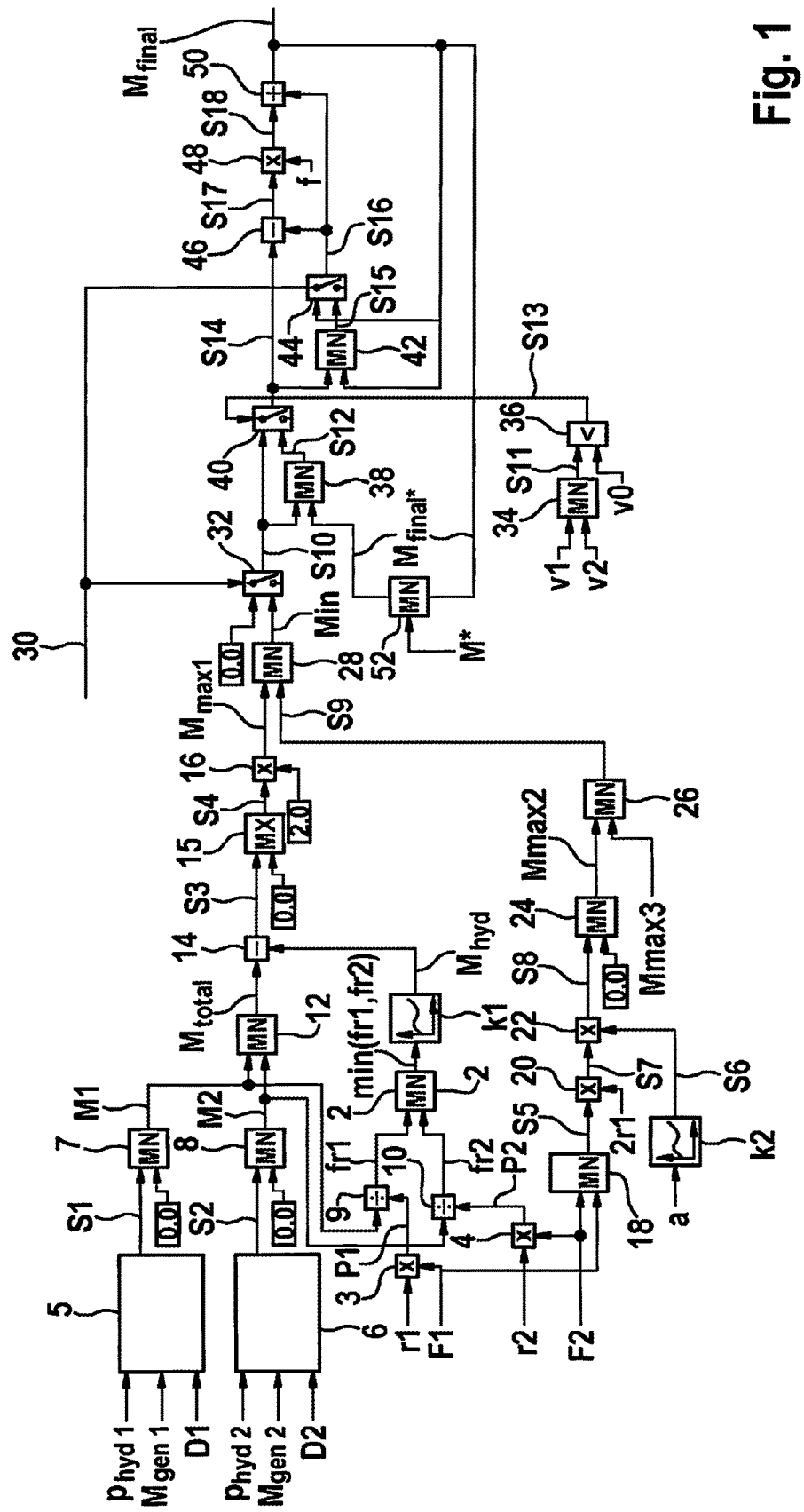

FIG. 1 shows a block diagram to explain one specific embodiment of the method for operating a regenerative braking system.

Figure 2:
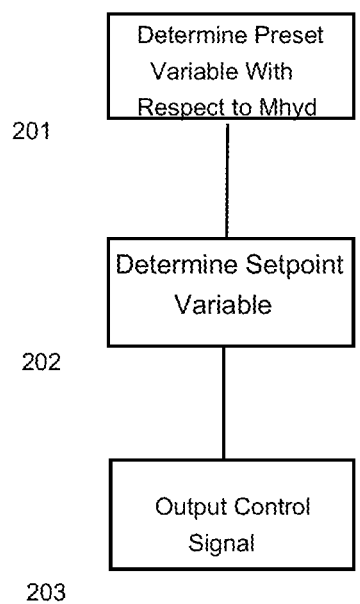

FIG. 2 shows a flow diagram to explain one specific embodiment of the method for operating a regenerative braking system.

The method which is schematically shown with the aid of FIG. 1 is suitable for operating a regenerative braking system of a vehicle/motor vehicle. The vehicle/motor vehicle which is equipped with the regenerative braking system may be, for example, an electric vehicle or hybrid vehicle. It is to be noted that the executability of the method is not limited to a specific vehicle type/motor vehicle type. A variety of regenerative braking systems may also be used with a regeneratively operable electric motor to execute the method. The executability of the method is therefore also not restricted to a specific braking system type.

During the execution of the method, at least one setpoint variable $M_{final}$ is determined with respect to at least one setpoint generator braking torque $M_{final}$, which is to be exerted with the aid of the electric motor of the regenerative braking system on at least one wheel, which may be regeneratively braked, of the vehicle equipped with the regenerative braking system. The at least one setpoint variable $M_{final}$ may be, for example, at least one setpoint generator braking torque which is determined individually by wheel for the particular wheel which may be regeneratively braked or a setpoint generator braking torque $M_{final}$ which is determined identically for all wheels which may be regeneratively braked. However, it is to be noted that indirect determination of the at least one setpoint generator braking torque $M_{final}$ is possible with the aid of the at least one setpoint variable $M_{final}$. The at least one setpoint variable $M_{final}$ may therefore also be, for example, a control variable of the electric motor.

To determine the at least one setpoint variable $M_{final}$, at least one preset variable $M_{hyd}$ is determined with respect to at least one hydraulic minimum braking torque $M_{hyd}$ to be exerted on the at least one wheel which may be regeneratively braked. The particular determined hydraulic minimum braking torque $M_{hyd}$ is preferably to be exerted with the aid of at least one associated wheel brake cylinder (and/or at least one associated wheel brake caliper) on the at least one wheel which may be regeneratively braked. Preferably, after the determination of the at least one preset variable $M_{hyd}$, at least one hydraulic component of the regenerative braking system, for example, at least one valve and/or at least one pump, is operated/controlled in such a way that in each case a brake pressure corresponding to the at least one preset variable $M_{hyd}$ is set in the at least one associated wheel brake cylinder. The at least one preset variable $M_{hyd}$ may therefore be, for example, hydraulic minimum braking torque $M_{hyd}$ to be exerted on the at least one wheel which may be regeneratively braked and/or a corresponding control variable of the at least one hydraulic component of the regenerative braking system. Other variables may also be determined as the at least one preset variable $M_{hyd}$.

The at least one preset variable $M_{hyd}$ is determined in consideration of at least one first variable fr1 and fr2 with a respect to a (utilized) coefficient of friction fr1 and fr2 occurring in each case at the at least one wheel which may be regeneratively braked. Therefore, the at least one preset variable $M_{hyd}$ may be determined with respect to hydraulic minimum braking torque $M_{hyd}$ to be exerted on the at least one wheel which may be regeneratively braked in a simple way so that in the ABS case, a standard (hydraulic) ABS regulation is executable to avoid/remedy locking of the particular affected wheel. By way of the (direct or indirect) consideration of the at least one utilized coefficient of friction fr1 and fr2 in the determination of the at least one setpoint variable $M_{final}$, optimization thereof is possible on the wheel level.

The at least one preset variable $M_{hyd}$ is preferably determined so that particular hydraulic minimum braking torque $M_{hyd}$ linked thereto is higher the more critical the at least one first variable fr1 and/or fr2 is with respect to possible locking of the at least one wheel which may be regeneratively braked. For example, to determine the at least one preset variable $M_{hyd}$ in consideration of the at least one first variable fr1 and fr2, a corresponding first characteristic curve k1 may be used.

Subsequently, the at least one setpoint variable $M_{final}$ is determined in consideration of the at least one preset variable $M_{hyd}$ (and/or corresponding hydraulic minimum braking torque $M_{hyd}$). The electric motor is controlled thereafter in consideration of the at least one determined setpoint variable $M_{final}$. The control of the electric motor may be carried out in particular so that, with the aid of the electric motor, at least one actual generator braking torque corresponding to the at least one setpoint generator braking torque $M_{final}$, which is determined using the at least one setpoint variable $M_{final}$, is exerted on the particular wheel which may be regeneratively braked. (The electric motor used for this purpose may be in particular the electric drive motor of the vehicle/motor vehicle).

The above-described determination of the at least one preset variable $M_{hyd}$ in consideration of the at least one first variable fr1 and fr2 ensures that at all times during the execution of the method, locking of the at least one wheel which may be regeneratively braked may be reacted to with a reduction of the brake pressure existing in the adjacent wheel brake cylinder. At the same time, with the aid of the method described here (by way of the advantageous determination of the at least one setpoint variable $M_{final}$), the generator operation of the electric motor is adapted to the at least one hydraulic minimum braking torque $M_{hyd}$. It is therefore ensured that in spite of maintaining the at least one hydraulic minimum braking torque $M_{hyd}$, a braking intent requested by the driver and/or an automatic braking mechanism (for example, an ACC and/or an emergency braking system) is not exceeded. In particular, the method provides a master-slave relationship, in which ensuring the at least one hydraulic minimum braking torque $M_{hyd}$ assumes a master status, with respect to which the generator operation of the electric motor is optimized in the slave status. A standard (hydraulic) ABS regulating method is therefore executable in any needed case without a restriction or a termination of the generator operation of the electric motor.

In the specific embodiment of FIG. 1, the one preset variable $M_{hyd}$ for the one hydraulic minimum braking torque $M_{hyd}$ to be exerted equally on all wheels which may be regeneratively braked is determined in consideration of a minimum Min(fr1, fr2) of (utilized) coefficients of friction fr1 and fr2. By way of example, particular occurring (utilized) coefficients of friction fr1 and fr2 are output for this purpose at a computer block 2 for minimum calculation, and subsequently the one preset variable $M_{hyd}$ is determined as hydraulic minimum braking torque $M_{hyd}$ in consideration of minimum Min(fr1, fr2) and predefined first characteristic curve k1. However, particular preset variable $M_{hyd}$ may also be determined individually by wheel for all wheels which may be regeneratively braked in consideration of particular first variable fr1 or fr2 with respect to coefficient of friction fr1 or fr2 occurring at the particular wheel which may be regeneratively braked.

In the method of FIG. 1, the at least one first variable fr1 or fr2 is calculated as particular (utilized) coefficient of friction fr1 or fr2 from a wheel radius r1 or r2, respectively, of the particular wheel which may be regeneratively braked, a wheel contact force F1 or F2, respectively, of the particular wheel which may be regeneratively braked (or at least one second variable corresponding thereto), and a wheel braking torque M1 or M2 to be exerted hydraulically and regeneratively on the particular wheel which may be regeneratively braked. The at least one first variable fr1 or fr2 may be, for example, at least one variable derived from at least one measured value. At computer blocks 3 and 4, a product P1 and P2 is calculated from particular radius r1 or r2 and particular wheel contact force F1 or F2 (or the at least one corresponding second variable) for each wheel which may be regeneratively braked. (Particular (dynamic) wheel contact force F1 and F2 may be derived/calculated from measured or estimated values for the vehicle longitudinal acceleration and the vehicle lateral acceleration in a conventional way.) In addition, in computer blocks 5 and 6, for each wheel which may be regeneratively braked, hydraulic brake pressure $P_{hyd1}$ or $P_{hyd2}$ thereof, actual generator braking torque $M_{gen1}$ or $M_{gen2}$ thereof, and principle of linear momentum (principle of angular momentum) D1 or D2 thereof are analyzed to determine its wheel braking torque M1 and M2 which is to be exerted hydraulically and regeneratively. With the aid of a minimum calculation of signals S1 and S2 of computer blocks 5 and 6 in each case with a value 0.0, it is ensured at computer blocks 7 and 8 for minimum calculation that wheel braking torques M1 and M2 are less than or equal to zero. Subsequently, (utilized) coefficients of friction fr1 or fr2 are determined at computer blocks 9 and 10 for each wheel which may be regeneratively braked in each case as a quotient of wheel braking torque M1 and M2 to be exerted hydraulically and regeneratively and product P1 or P2. Utilized coefficients of friction fr1 or fr2 are therefore determinable reliably, which ensures an advantageous determination of the at least one hydraulic minimum braking torque $M_{hyd}$ for each wheel which may be regeneratively braked. This ensures, if needed, the desired regulating quality of a standard (hydraulic) ABS regulation at each wheel which may be regeneratively braked.

In addition, in the method of FIG. 1, at least one first highest generator braking torque $M_{max1}$ for the at least one wheel which may be regeneratively braked is determined as the difference of a total braking torque $M_{total}$ to be exerted on the particular wheel which may be regeneratively braked and hydraulic minimum braking torque $M_{hyd}$ determined for the particular wheel which may be regeneratively braked. By way of example, total braking torque $M_{total}$ is determined in that wheel braking torques M1 and M2 are output at a computer block 12 for minimum calculation. Thereafter, hydraulic minimum braking torque $M_{hyd}$ determined for all wheels which may be regeneratively braked is subtracted from total braking torque $M_{total}$ at a computer block 14. With the aid of a maximum calculation of a signal S3 of computer block 14 and a value 0.0, negative signals S3 are filtered out at a computer block 15 (for maximum calculation). A signal S4 output by computer block 15 for maximum calculation is multiplied at a computer block 16 by the number of wheels which may be regeneratively braked in each case (the value 2.0 here). In this way, the at least one first highest generator braking torque $M_{max1}$ is obtained. (In the procedure described here, only the one first highest generator braking torque $M_{max1}$ is determined. Alternatively, a determination individually by wheel of multiple highest generator braking torques $M_{max1}$ may also be carried out.)

As an advantageous refinement, in the method of FIG. 1, in consideration of a predefined second characteristic curve k2 and the at least one wheel contact force F1 and F2 occurring in each case at the at least one wheel which may be regeneratively braked (or the at least one corresponding second variable), at least one second highest generator braking torque $M_{max2}$ is determined for the at least one wheel which may be regeneratively braked. For this purpose, a minimum is ascertained at a computer block 18 from wheel contact forces F1 and F2 of the wheels which may be regeneratively braked. Signal S5 of computer block 18 for minimum calculation is subsequently doubled and multiplied by the wheel radius in computer block 20. In addition, a signal S6 is obtained from vehicle deceleration a and second characteristic curve k2, which is multiplied at a computer block 22 by a signal S7 of computer block 20. A signal S8 of computer block 22 is compared to a value of 0.0 at a computer block 24 for maximum calculation, to ensure that the at least one second highest generator braking torque $M_{max2}$ which is output by computer block 22 is greater than zero.

With the aid of the advantageous utilization of second characteristic curve k2, variables which characterize the vehicle dynamics, for example, understeering and oversteering tendencies, may also be taken into consideration in the determination of the at least one second highest generator braking torque $M_{max2}$. This ensures at least one second highest generator braking torque $M_{max2}$ based on characteristic variables of the vehicle level, while the above-described at least one first highest generator braking torque $M_{max1}$ is based on characteristic variables of the wheel level.

In the method of FIG. 1, in consideration of a provided item of information with respect to a generator potential of the electrical motor, at least one third highest generator braking torque $M_{max3}$ is also determined for the at least one wheel which may be regeneratively braked. The provided information may include, for example, an item of information about an instantaneous vehicle velocity of the particular vehicle and/or about an instantaneous charge level of a battery chargeable with the aid of the electric motor. The instantaneous driver braking command may also be taken into consideration in the determination of the at least one third highest generator braking torque $M_{max3}$. It may therefore also be taken into consideration that the generator potential of the electric motor is restricted in the event of a present vehicle velocity less than a predefined minimum velocity suitable for regenerative braking or in the event of a complete charge of the particular battery. Because processes for determining the generator potential and/or the at least one third highest generator braking torque $M_{max3}$ are known, they are not illustrated in FIG. 1. The items of information for the generator potential may be externally transmitted, and are therefore easily modifiable.

In the method of FIG. 1, the at least one setpoint variable $M_{final}$ is determined in consideration of the at least one first highest generator braking torque $M_{max1}$, the at least one second highest generator braking torque $M_{max2}$, and the at least one third highest generator braking torque $M_{max3}$. For this purpose, for the at least one wheel which may be regeneratively braked, at least one minimum variable Min is determined from particular first highest generator braking torque $M_{max1}$, particular second highest generator braking torque $M_{max2}$, and particular third highest braking torque $M_{max3}$. By way of example, a signal S9 is first ascertained as a minimum of second highest generator braking torque $M_{max2}$ and third highest generator braking torque $M_{max3}$ at a computer block 26 for minimum calculation. Thereafter, the at least one minimum variable Min is determined as the minimum of first highest generator braking torque $M_{max1}$ and signal S9 of computer block 26 with the aid of a computer block 28 for minimum calculation.

In the specific embodiment of FIG. 1, the driver and/or the automatic braking mechanism is able to specify whether the electric motor is to be used for braking the vehicle or not. A corresponding switching signal 30, which may be triggered by the driver and/or the automatic braking mechanism, is provided at a switch 32 together with the at least one determined minimum variable Min and a value 0.0. Switch 32 is switchable with the aid of switching signal 30 in such a way that, if generator operation of the electric motor is desired by the driver and/or the automatic braking mechanism, the at least one minimum variable Min is output by switch 32 as a signal S10. Otherwise, instead of the at least one minimum variable Min, value 0.0 may be output by switch 32 as signal S10.

As an advantageous refinement, in the method of FIG. 1, in addition at least one wheel velocity value v1 or v2 of the at least one wheel which may be regeneratively braked is compared to at least one predefined threshold value v0. For this purpose, firstly a signal S11 is ascertained as a minimum of the at least one wheel velocity value v1 and v2 with the aid of a computer block 34 for minimum calculation and subsequently signal S11 of computer block 34 is compared in a computer block 36 to the at least one predefined threshold value v0. If the at least one wheel velocity value v1 and v2 falls below the at least one predefined threshold value v0, i.e., signal S11 is less than the at least one predefined threshold value v0, the at least one setpoint generator braking torque is only permitted to be kept constant or reduced upon the determination of the at least one setpoint variable $M_{final}$. This may be understood to mean that, if the at least one wheel velocity value v1 and v2 falls below the at least one predefined threshold value v0, a redetermination of the at least one setpoint variable $M_{final}$ is only possible if setpoint generator braking torque $M_{final}$ corresponding to redetermined setpoint variable $M_{final}$ is less than a setpoint generator braking torque $M_{final}$* determined (directly or indirectly), immediately beforehand. In contrast, if the at least one wheel velocity value v1 and v2 falling below the at least one predefined threshold value v0 may not be determined, a redetermination of the at least one setpoint variable $M_{final}$ is also possible if setpoint generator braking torque $M_{final}$ corresponding to redetermined setpoint variable $M_{final}$ is greater than a setpoint generator braking torque $M_{final}$* determined (directly or indirectly) immediately beforehand.

Therefore, in the method of FIG. 1, the wheel behavior of the at least one wheel which may be regeneratively braked may be observed. If a wheel slip threshold or velocity threshold which is predefined with the aid of the at least one threshold value v0 is fallen below, an instantaneous increase of the at least one setpoint generator braking torque $M_{final}$ may be suppressed, in that setpoint generator braking torque $M_{final}$*, which was determined immediately beforehand and is instantaneously active, is maintained. Therefore, in the event of falling below the predefined wheel slip threshold or velocity threshold, the at least one setpoint generator braking torque $M_{final}$ is no longer increased further, but rather only kept constant or reduced. An increase of the at least one setpoint generator braking torque $M_{final}$ may only be permitted again with the aid of a corresponding redetermination of the at least one setpoint variable $M_{final}$ when all wheels which may be regeneratively braked again display a stable wheel behavior.

An increase of the at least one setpoint generator braking torque $M_{final}$ in relation to setpoint generator braking torque $M_{final}$*, which was determined immediately beforehand and is instantaneously active, is preventable in that firstly signal S10 of switch 32 is output together with presently active setpoint generator braking torque $M_{final}$* at a computer block 38 for minimum calculation. Computer block 38 outputs the ascertained minimum as signal S12. If the at least one wheel velocity value v1 and v2 falls below the at least one predefined threshold value v0, or if signal S11 is less than the at least one predefined threshold value v0, computer block 36 outputs a corresponding signal S13 at a further switch 40, at which signals S10 and S12 are also provided. Switch 40 is switchable with the aid of signal S13 in such a way that, if signal S11 is less than the at least one predefined threshold value v0, switch 40 outputs signal S10 as a signal 514. Otherwise, switch 40 outputs signal S12 as signal S14.

Signal S14 is processed by an asymmetrical filter. Increases of the at least one setpoint generator braking torque $M_{final}$ are filtered in such a way that a soft buildup of the at least one setpoint generator braking torque $M_{final}$ is achievable. In contrast, reductions of the at least one setpoint generator braking torque $M_{final}$ are implemented immediately. For this purpose, signal S14 is compared to presently active setpoint generator braking torque $M_{final}*$ at a computer block 42 for minimum calculation. The minimum of signal S14 and presently active setpoint generator braking torque $M_{final}*$ is output by computer block 42 for minimum calculation as a signal S15 at a switch 44, at which presently active setpoint generator braking torque $M_{final}*$ is also provided. Switch 44 is switchable like above-described switch 32 with the aid of switching signal 30. A signal S16 of switch 44 is subtracted with the aid of computer block 46 from signal S14. Subsequently, a signal S17 of computer block 46 is multiplied at a computer block 48 by a filter time constant f. A signal S18 of computer block 48 is subsequently added at a computer block 50 to signal S16. This causes the desired asymmetrical filtering of the at least one setpoint generator braking torque $M_{final}$. (In addition, filter time constant f may be adapted to fadeout operation (fading out of the torque).) In addition, as a supplement, presently active setpoint generator braking torque $M_{final}*$ may also be adapted to a present actual braking torque M*, in that presently active setpoint generator braking torque $M_{final}*$ and present actual braking torque M* are provided at a computer block 52 for minimum calculation. The computer block subsequently (re-)determines signal $M_{final}*$ output at computer block 38.

The method of FIG. 1 ensures that even in the case of generator operation of the electric motor, a minimum brake pressure is always maintained in each wheel brake cylinder of the at least one wheel which may be hydraulically braked. The optimum wheel deceleration is therefore settable at any time with the aid of the ABS regulating algorithm. The ABS regulating algorithm does not have to control the electric motor directly for this purpose. This task is omitted as a result of the advantageous determination of the at least one setpoint variable $M_{final}$ with the aid of the above-described method. (A reduction of the at least one setpoint generator braking torque $M_{final}$ may be triggered indirectly via a brake pressure reduction of the ABS.)

The method of FIG. 1 enables a specification of the at least one setpoint generator braking torque $M_{final}$ (i.e., the regeneration torque) in the sense of a pilot control. FIG. 1 relates to a vehicle having an axle differential on exactly two (drivable) wheels which may be regeneratively braked with the aid of the electric motor. For example, the two wheels which may be regeneratively braked may be understood as the wheels connected to the front axle of the vehicle equipped with the regenerative braking system. However, it is to be noted that the method of FIG. 1 is also applicable in an altered version for use on the rear axle, or on two axles which may be electrically braked, or in the case of individual wheel electric drives.

The method of FIG. 1 may cooperate with an external ABS algorithm. The at least one setpoint generator braking torque $M_{final}$ (i.e., the regeneration torque) may therefore also be at least partially maintained during an active ABS regulation. A mean brake pressure level of the at least one wheel brake cylinder of the regenerative braking system is significantly lower during ABS braking using regeneration at corresponding (utilized) coefficient of friction than in the case of solely hydraulic braking with equal vehicle deceleration. A thermal potential of the wheel brakes on at least one axle may therefore often be reduced, which results in a savings in cost and weight on the braking system.

The input variables required for executing the method illustrated with the aid of FIG. 1 are generally available in a vehicle network. In addition, the required input variables may be measured or derived easily. A control unit architecture optimized with respect to the signal runtimes is easily implementable.

The method of FIG. 1 may be executable in particular with the aid of a control device for a regenerative braking system. Such a control device has control electronics, with the aid of which the at least one setpoint variable $M_{final}$ is determinable with respect to the at least one setpoint generator braking torque $M_{final}$, which is to be exerted with the aid of the electric motor of the regenerative braking system on the at least one wheel which may be regeneratively braked. In addition, at least one control signal corresponding to the at least one determined setpoint variable $M_{final}$ may be output at the electric motor with the aid of the control electronics. As already described above, the control electronics are designed, in consideration of the at least one provided first variable fr1 and fr2 with respect to coefficient of friction fr1 and fr2 occurring in each case at the at least one wheel which may be regeneratively braked, to determine the at least one preset variable $M_{hyd}$ with respect to hydraulic minimum braking torque $M_{hyd}$ to be exerted on the at least one wheel which may be regeneratively braked, and, in consideration of at least the at least one determined hydraulic minimum braking torque $M_{hyd}$, to determine the at least one setpoint variable $M_{final}$. Furthermore, the control electronics may be refined to execute the above-described method steps.

FIG. 2 shows a flow diagram for a regenerative braking system according to the present invention. According to step 201, at least one preset variable is determined with respect to at least one hydraulic minimum braking torque ($M_{hyd}$) to be exerted on at least one wheel, which may be regeneratively braked, of a vehicle equipped with the regenerative braking system in consideration of at least one first variable with respect to a utilized coefficient of friction occurring in each case at the at least one wheel which may be regeneratively braked. According to step 203, at least one setpoint variable is determined in consideration of the at least one established preset variable, the at least one setpoint variable corresponding to at least one setpoint generator braking torque that is to be exerted with the aid of an electric motor of the regenerative braking system on the at least one wheel which may be regeneratively braked. According to step 203, a control signal is output for controlling the electric motor in consideration of the at least one determined setpoint variable.

What is claimed is:

1. A method for operating a regenerative braking system, comprising:
   determining at least one preset variable with respect to at least one hydraulic minimum braking torque ($M_{hwd}$) to be exerted on at least one wheel, which may be regeneratively braked, of a vehicle equipped with the regenerative braking system in consideration of at least one first variable with respect to a utilized coefficient of friction occurring in each case at the at least one wheel which may be regeneratively braked;

determining at least one setpoint variable in consideration of the at least one established preset variable, the at least one setpoint variable corresponding to at least one setpoint generator braking torque that is to be exerted with the aid of an electric motor of the regenerative braking system on the at least one wheel which may be regeneratively braked; and outputting a control signal for controlling the electric motor in consideration of the at least one determined setpoint variable.

2. The method as recited in claim 1, wherein for all wheels which may be regeneratively braked, the preset variable is determined individually by wheel in consideration of the first variable with respect to the utilized coefficient of friction occurring at the particular wheel which may be regeneratively braked.

3. The method as recited in claim 1, wherein the preset variable for the hydraulic minimum braking torque to be exerted equally on all wheels which may be regeneratively braked is determined in consideration of a minimum of the first variables.

4. The method as recited in claim 3, wherein at least one first highest generator braking torque is determined for the at least one wheel which may be regeneratively braked as a difference of a total braking torque to be exerted on the particular wheel which may be regeneratively braked and the hydraulic minimum braking torque determined for the wheel which may be regeneratively braked as the preset variable, and the at least one setpoint variable is determined in consideration of the at least one determined first highest generator braking torque.

5. The method as recited in claim 4, wherein, in consideration of a predefined characteristic curve and at least one provided second variable with respect to a wheel contact force occurring in each case on the at least one wheel which may be regeneratively braked, at least one second highest generator braking torque) is determined for the at least one wheel which may be regeneratively braked, and the at least one setpoint variable is determined with additional consideration of the at least one determined second highest generator braking torque.

6. The method as recited in claim 5, wherein, in consideration of a provided item of information with respect to a generator potential of the electric motor, at least one third highest generator braking torque is determined for the at least one wheel which may be regeneratively braked, and the at least one setpoint variable is determined with additional consideration of the at least one determined third highest generator braking torque.

7. The method as recited in claim 6, wherein at least one wheel velocity value of the at least one wheel which may be regeneratively braked is compared to at least one predefined threshold value and, if the at least one wheel velocity value falls below the at least one predefined threshold value, the at least one setpoint generator braking torque is only permitted to be kept constant or reduced upon the determination of the at least one setpoint variable.

8. A control device for a regenerative braking system, comprising:
control electronics that include:
an arrangement for determining at least one preset variable with respect to at least one hydraulic minimum braking torque ($M_{hyd}$) to be exerted on at least one wheel, which may be regeneratively braked, of a vehicle equipped with the regenerative braking system in consideration of at least one first variable with respect to a utilized coefficient of friction occurring in each case at the at least one wheel which may be regeneratively braked;

an arrangement for determining at least one setpoint variable in consideration of the at least one preset variable, the at least one setpoint variable corresponding to at least one setpoint generator braking torque that is to be exerted with the aid of an electric motor of the regenerative braking system on the at least one wheel which may be regeneratively braked; and an arrangement for outputting a control signal for controlling the electric motor in consideration of the at least one determined setpoint variable.

9. The control device as recited in claim 8, wherein the preset variable is determinable, with the aid of the control electronics for all wheels which may be regeneratively braked, individually by wheel in consideration of a first variable with respect to the utilized coefficient of friction occurring at the at least one wheel which may be regeneratively braked.

10. The control device as recited in claim 8, wherein the preset variable for the hydraulic minimum braking torque to be exerted equally on all wheels which may be regeneratively braked is determinable in consideration of a minimum of the first variables with the aid of the control electronics.

11. The control device as recited in claim 8, wherein the control electronics are designed to determine at least one first highest generator braking torque for the at least one wheel which may be regeneratively braked as a difference of a total braking torque to be exerted on the particular wheel which may be regeneratively braked and the hydraulic minimum braking torque determined as the preset variable for the wheel which may be regeneratively braked, and, in consideration of the at least one determined first generator braking torque, to determine the at least one setpoint variable.

12. The control device as recited in claim 11, wherein the control electronics are designed to determine, in consideration of a predefined characteristic curve and at least one provided second variable with respect to a minimum of the wheel contact forces occurring in each case on the at least one wheel which may be regeneratively braked, at least one second highest generator braking torque for the at least one wheel which may be regeneratively braked, and to determine the at least one setpoint variable with additional consideration of the at least one determined second highest generator braking torque.

13. The control device as recited in claim 12, wherein the control electronics are designed, in consideration of a provided item of information with respect to a generator potential of the electric motor, to determine at least one third highest generator braking torque for the at least one wheel which may be regeneratively braked, and to determine the at least one setpoint variable with additional consideration of the at least one determined third highest generator braking torque.

14. The control device as recited in claim 13, wherein the control electronics are designed to determine, for the at least one wheel which may be regeneratively braked, at least one minimum variable from at least one of the first highest generator braking torque, the second highest generator braking torque, and the third highest generator braking torque, and to determine the at least one setpoint variable in consideration of the at least one minimum variable.

15. The control device as recited in claim 8, wherein the control electronics are designed to compare at least one wheel velocity value of the at least one wheel which may be regeneratively braked to at least one predefined threshold value and, if the at least one wheel velocity value falls below the at least one predefined threshold value, to permit only the at least one setpoint generator braking torque to be kept constant or reduced upon the determination of the at least one setpoint variable.

\* \* \* \* \*